US008812652B2

(12) United States Patent
Wang et al.

(10) Patent No.: US 8,812,652 B2
(45) Date of Patent: Aug. 19, 2014

(54) HONEY MONKEY NETWORK EXPLORATION

(75) Inventors: Yi-Min Wang, Bellevue, WA (US); Douglas R. Beck, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 333 days.

(21) Appl. No.: 12/818,038

(22) Filed: Jun. 17, 2010

(65) Prior Publication Data

US 2010/0257592 A1 Oct. 7, 2010

Related U.S. Application Data

(62) Division of application No. 11/276,483, filed on Mar. 1, 2006, now Pat. No. 7,774,459.

(51) Int. Cl.
*G06F 15/173* (2006.01)

(52) U.S. Cl.
USPC .............................. 709/224; 726/25

(58) Field of Classification Search
USPC ................... 709/224; 726/22–25
See application file for complete search history.

(56) References Cited

U.S. PATENT DOCUMENTS

| | | | |
|---|---|---|---|
| 6,466,966 B1 * | 10/2002 | Kirsch et al. | 709/203 |
| 6,745,367 B1 * | 6/2004 | Bates et al. | 715/205 |
| 7,418,733 B2 * | 8/2008 | Connary et al. | 726/25 |
| 2002/0065842 A1 * | 5/2002 | Takagi et al. | 707/500 |
| 2002/0174201 A1 * | 11/2002 | Ramer et al. | 709/220 |
| 2003/0005044 A1 * | 1/2003 | Miller et al. | 709/203 |
| 2003/0084329 A1 * | 5/2003 | Tarquini | 713/200 |
| 2003/0088792 A1 * | 5/2003 | Card et al. | 713/201 |
| 2005/0021943 A1 * | 1/2005 | Ikudome et al. | 713/160 |
| 2005/0050353 A1 | 3/2005 | Thiele et al. | |
| 2005/0171932 A1 * | 8/2005 | Nandhra | 707/3 |
| 2005/0273857 A1 * | 12/2005 | Freund | 726/23 |
| 2006/0075494 A1 * | 4/2006 | Bertman et al. | 726/22 |
| 2006/0095558 A1 * | 5/2006 | Christian | 709/224 |
| 2006/0136294 A1 * | 6/2006 | Linden et al. | 705/14 |
| 2006/0253454 A1 | 11/2006 | Coppola et al. | |
| 2006/0265345 A1 * | 11/2006 | Christian et al. | 707/1 |
| 2007/0016948 A1 * | 1/2007 | Dubrovsky et al. | 726/22 |
| 2007/0016951 A1 | 1/2007 | Piccard et al. | |
| 2007/0083640 A1 * | 4/2007 | Wagner et al. | 709/224 |
| 2007/0174915 A1 | 7/2007 | Gribble et al. | |
| 2007/0186285 A1 | 8/2007 | Hurst et al. | |
| 2008/0168169 A1 * | 7/2008 | Cope | 709/224 |
| 2010/0174706 A1 * | 7/2010 | Bushee et al. | 707/723 |
| 2010/0251217 A1 * | 9/2010 | Miller | 717/126 |
| 2011/0276561 A1 * | 11/2011 | Dulitz et al. | 707/709 |

OTHER PUBLICATIONS

Holz, "New Fields of Application for Honeynets", Department of Computer Science Diploma Thesis, Aug. 24, 2005, pp. 1-28.

(Continued)

*Primary Examiner* — Abdullahi Salad
(74) *Attorney, Agent, or Firm* — Dan Choi; Carole Boelitz; Micky Minhas

(57) ABSTRACT

A network can be explored to investigate exploitive behavior. For example, network sites may be actively explored by a honey monkey system to detect if they are capable of accomplishing exploits, including browser-based exploits, on a machine Also, the accomplishment of exploits may be detected by tracing events occurring on a machine after visiting a network site and analyzing the traced events for illicit behavior. Alternatively, site redirections between and among uniform resource locators (URLs) may be explored to discover relationships between sites that are visited.

20 Claims, 10 Drawing Sheets

(56) References Cited

OTHER PUBLICATIONS

Honeyclient Development Project, available at <<http://www.honeyclient.org/>>, Retrieved Apr. 21, 2006, 3 pages.

Moshchuk, et al, "A Crawler-Based Study of Spyware on the Web", Department of Computer Science & Engineering University of Washington, Feb. 2006, pp. 1-17.

Spitzner, "Idea on Client Honeypots", retrieved on Jan. 15, 2008 at <<http://www.securityforcus.com/archive/119/366293/30/1410/threaded>>, Security Focus, published Jun. 17, 2004, 2 pages.

Wang, et al., "Strider: A Black-box, State-based Approach to Change and Configuration Management and Support", in Proc. Usenix LISA and available at <<http://www.usenix.org/events/lisa03/tech/wang/wang.pdf.>>, Oct. 2003, pp. 159-172.

Wang, "Using Honeyclients to Detect New Attacks", Syn Ack Labs, 2005, pp. 1-37.

* cited by examiner

TRACE-DRIVEN "BLACK-BOX" EXPLOIT DETECTION

HONEY MONKEY NETWORK EXPLORATION

PRIORITY CLAIM

This application claims priority from and is a divisional application of U.S. patent application Ser. No. 11/276,483, filed on Mar. 1, 2006, which is incorporated by reference herein.

BACKGROUND

Computers are used to conduct business, acquire information, and experience entertainment by visiting sites on the internet. Unfortunately, some internet sites are designed to accomplish actions that are not requested by a user. These actions can result in harm to a computer and/or to the user of the computer.

Malware is one term for software that can cause harm to a user. For example, malware may report relatively innocuous generic marketing-related information and/or reduce the performance of a computer in which it has been installed. However, malware can also damage or even destroy data files on a computer. Moreover, and perhaps most dangerously, malware can also be used to steal valuable personal or financial information.

Malware may be installed without a user's knowledge, or the full extent of a malware program's functionality may be unknown to a user when installation is authorized. In any case, malware is typically software that a user would ultimately rather not have present, functional, or executing on his or her computer because of the attendant risks. Consequently, internet sites that wish to install malware have developed convoluted and secretive mechanisms for doing so without full knowledge of the user and even without first acquiring any authorization from a user.

SUMMARY

A network can be explored to investigate exploitive behavior. For example, network sites may be actively explored by a honey monkey system to detect if they are capable of accomplishing exploits, including browser-based exploits, on a machine. Also, the accomplishment of exploits may be detected by tracing events occurring on a machine after visiting a network site and analyzing the traced events for illicit behavior. Alternatively, site redirections between and among uniform resource locators (URLs) may be explored to discover relationships between the sites that are visited.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

This detailed description is divided into four sections. The four sections are entitled "Example General Implementations for Honey Monkey Network Exploration", "Example Specific Implementations for Honey Monkey Network Exploration", "A Specific Example Multi-Stage Implementation for a Honey Monkey Exploit Detection System", and "Example Device Implementations for Honey Monkey Network Exploration".

Example General Implementations for Honey Monkey Network Exploration

Figure 1:
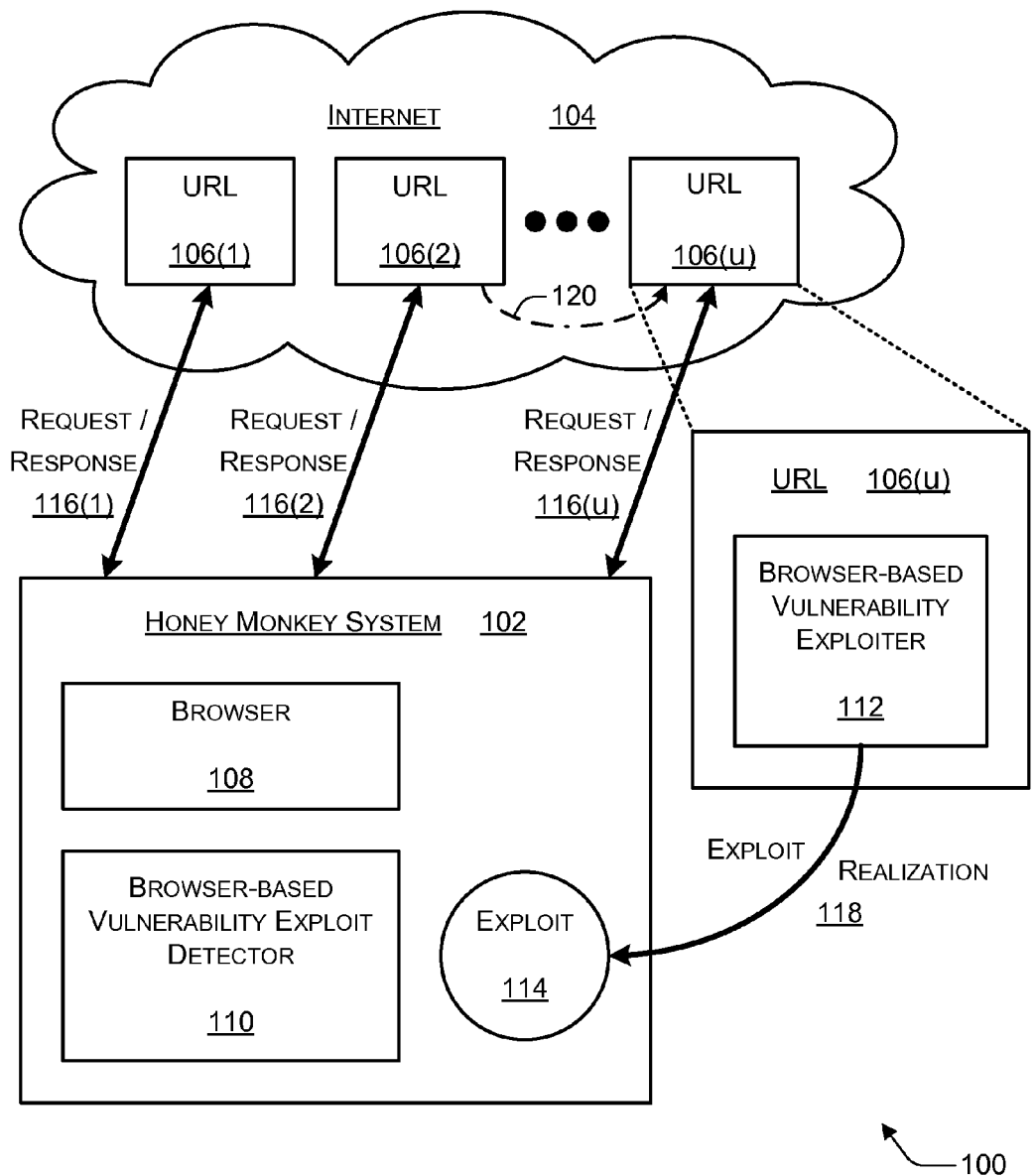
FIG. 1 is a block diagram example of a honey monkey system that is capable of exploring a network.

FIG. 1 is a block diagram 100 example of a honey monkey system 102 that is capable of exploring a network. Block diagram 100 includes honey monkey system 102, a network, and multiple network locations. The network is represented by an internet 104. However, any general network may alternatively be explored by honey monkey system 102. The multiple network locations are represented by uniform resource locators (URLs) 106. However, other identifiers of network locations or nodes may alternatively be used.

As illustrated, honey monkey system 102 includes a browser 108 and a browser-based vulnerability exploit detector 110. Internet 104 includes some number "u" of URLs 106, with "u" being an integer. Specifically, internet 104 includes URL 106(1), URL 106(2) . . . URL 106(u). URLs represent some location, node, etc. on internet 104. An example location is a site on the so-called world wide web (WWW).

An expanded diagram for URL 106(u) includes a browser-based vulnerability exploiter 112. Browser-based vulnerability exploiter 112 is capable of installing, creating, realizing, or otherwise accomplishing an exploit 114 during communication exchanges with honey monkey system 102. These communication exchanges are represented by request/response exchanges 116. Specifically, "u" request/response exchanges 116(1), 116(2) . . . 116(u) occur between honey monkey system 102 and URL 106(1), 106(2) . . . 106(u), respectively.

In a described implementation, honey monkey system 102 actively explores internet 104 by sending an information request to a URL 106 in order to elicit a response as part of a request/response exchange 116. Honey monkey system 102 uses browser 108 to make the request in order to emulate the appearance of a standard browsing environment, including any vulnerability or vulnerabilities that browser 108 might expose to URLs 106.

Standard responses are directed to browser 108 within honey monkey system 102. However, suspect responses may be directed fully or partially to other software components. In operation, a so-called sandbox is created for browser 108. Typically, a browser is capable of creating its own sandbox, and it does so automatically to limit what changes the components loaded into the browser process can make during normal operations. When accomplishing an exploit 114, the suspect responses usually extend beyond the browser sandbox. In an example implementation, events that extend beyond the browser sandbox are detectable by browser-based vulnerability exploit detector 110. An example of an exploit 114 is the installation of malware. Malware examples are described further herein below.

By way of specific example, honey monkey system 102 directs browser 108 to visit URL 106(u) by requesting information from URL 106(u) as a result of a redirection 120 from URL 106(2). A user actually intends to visit URL 106(2). However, URL 106(2) responds with the requested information and additionally instructs the browser to visit URL 106(u), which constitutes an example redirection 120. The exploiter served by URL 106(u) is the requested information with respect to URL 106(u). In short, URL 106(u) is a bad actor and includes browser-based vulnerability exploiter 112. As at least part of request/response exchange 116(u), URL 106(u) activates browser-based vulnerability exploiter 112. Browser-based vulnerability exploiter 112 accomplishes exploit 114 at exploit realization 118. Exploit realization 118 may be execution of some code, installation of a program, creation or modification of a file, creation or adjustment to a registry setting, some combination thereof, and so forth.

Honey monkey system 102 uses browser-based vulnerability exploit detector 110 to detect exploit 114. Example detection mechanisms are described further herein below. Examples include a black-box/event tracing mechanism and a vulnerability-specific exploit detection mechanism. The former is described with particular reference to the flow diagram of FIG. 4.

Figure 2:
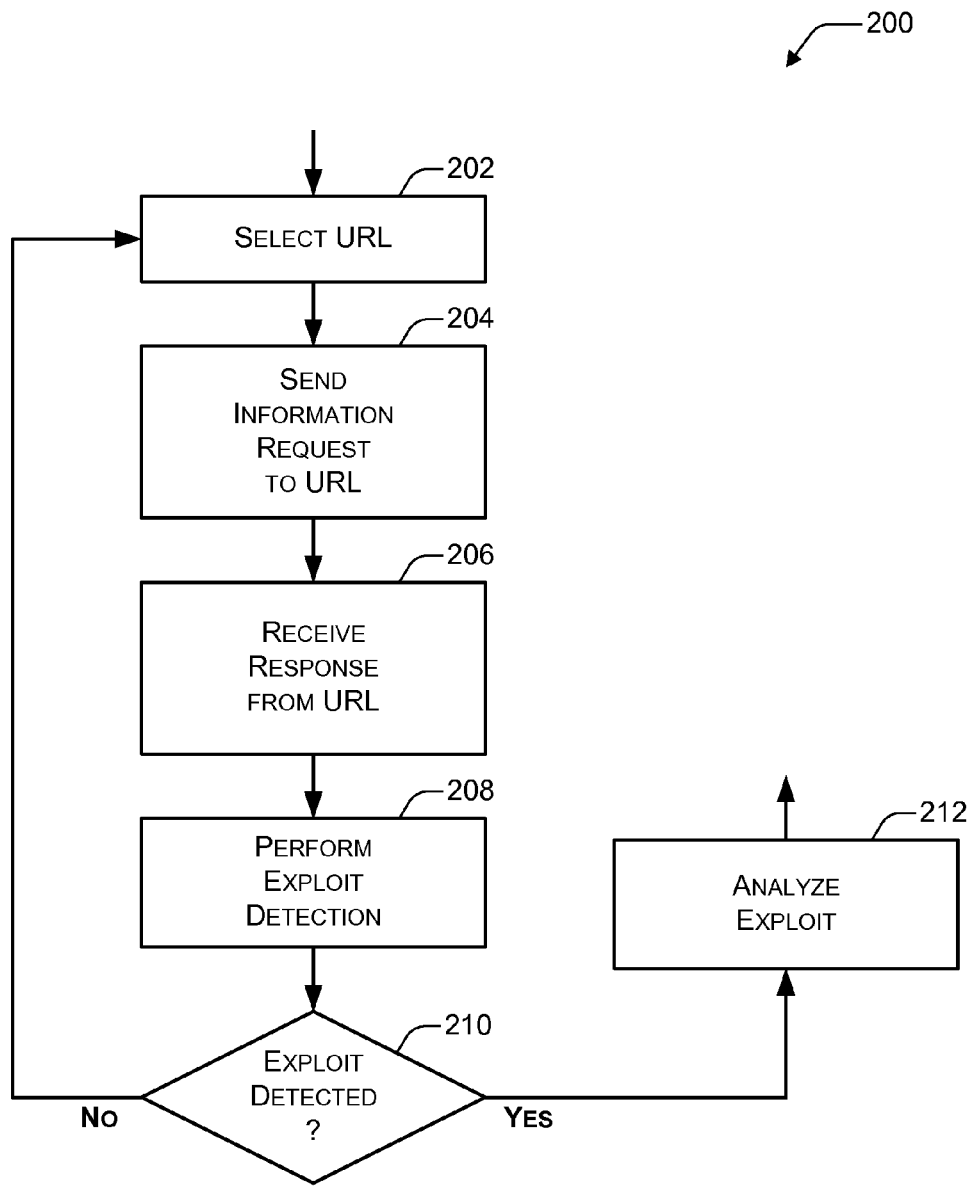
FIG. 2 is a flow diagram that illustrates an example of a method for exploring a network with a honey monkey system.

FIG. 2 is a flow diagram 200 that illustrates an example of a method for exploring a network with a honey monkey system. Flow diagram 200 includes six (6) blocks 202-212. Although the actions of flow diagram 200 may be performed in other environments and with a variety of hardware and software combinations, a honey monkey system 102 (of FIG. 1) may be used to implement the method of flow diagram 200.

At block 202, a URL is selected. For example, a honey monkey system 102 may select a URL 106(u). Honey monkey system 102 may also provide the selected URL 106(u) to a browser 108 along with an instruction to point the browser at the selected URL 106(u).

At block 204, an information request is sent to the selected URL. For example, browser 108 may target the selected URL 106(u) by sending an information request thereto. At block 206, a response is received from the targeted URL. For example, browser 108 may receive a response from the targeted URL 106(u) as part of a request/response exchange 116. If URL 106(u) includes a browser-based vulnerability exploiter 112, then the machine or device upon which honey monkey system 102 is executing may also "receive" an exploit 114 as a result of an exploit realization 118.

At block 208, an exploit detection is performed. For example, a browser-based vulnerability exploit detector 110 of honey monkey system 102 may attempt to detect if any exploit 114 has been accomplished (e.g., realized). At block 210, it is determined if an exploit is detected. If not, then another URL is selected (at block 202). For example, the other URL may be contacted with a newly-launched browser (at block 204).

If, on the other hand, an exploit is detected (at block 210), then at block 212 the detected exploit is analyzed. The analysis may optionally involve visiting URLs listed in a history of URLs that were visited as a result of browser redirection. The analysis may also optionally involve visiting the redirect URLs with a redirection blocking feature enabled so as to narrow down and actually identify pages that truly perform the exploits. Examples of redirection analysis are described further herein below with particular reference to FIGS. 6-8.

Example Specific Implementations For Honey Monkey Network Exploration

Example general implementations are described in the preceding section, and example specific implementations are described in this section as well as in the following section. However, the general and specific implementations are not mutually exclusive. By way of example only, aspects of specific implementation(s) may be incorporated into a general implementation. For instance, a honey monkey controller 304 and a virtual machine 306 (both of FIG. 3 as described herein below) may comprise all or part of a honey monkey system 102. Also, a honey monkey system 102 may incorporate some or all of the patch-escalation exploit analysis features described herein below with particular reference to FIG. 5. Furthermore, aspects of the specific implementations may be combined in many different manners. For example, the virtual machine concepts of FIG. 3 may be combined with the redirection analysis of FIGS. 6-8.

Example Virtual Machine Implementations

Figure 3:
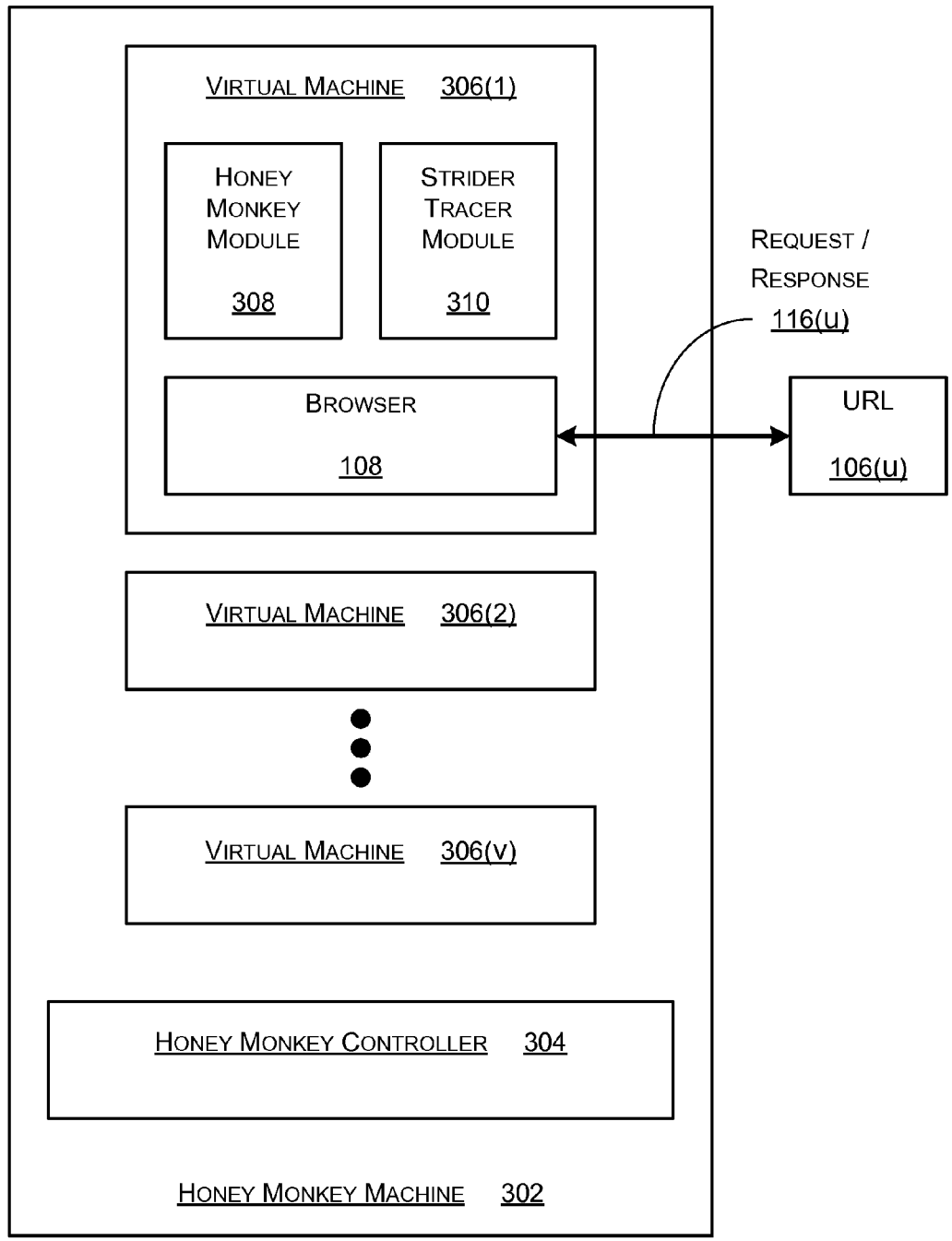
FIG. 3 is a block diagram of an example honey monkey machine having a honey monkey controller and multiple virtual machines.

FIG. 3 is a block diagram of an example honey monkey machine 302 having a honey monkey controller 304 and multiple virtual machines 306. As illustrated, honey monkey machine 302 includes "v" virtual machines 306(1), 306(2) . . . 306(v), with "v" being some integer. An example device that may comprise such a honey monkey machine 302 is described herein below with particular reference to FIG. 10.

The integer "v" may have any value of one or higher. So-called heavy-weight virtual machine products may be capable of having two, three, eight, or more virtual machines running on a single physical machine. So-called light-weight virtual machine products may be capable of having tens to even thousands of virtual machines running on a single physical machine.

In a described implementation, honey monkey controller 304 instantiates the "v" virtual machines 306. Each virtual machine 306 includes a honey monkey module 308, a strider tracer module 310, and browser 108. Although illustrated separately, honey monkey module 308 and strider tracer module 310 may reside in the same process. Moreover, honey monkey module 308 may be realized as two or more modules. For example, one module may reside in kernel mode as a driver, and the other module may reside in user mode as a dynamic-linked library (DLL) that is loaded into the process module. In operation, honey monkey module 308 directs browser 108 to engage in request/response exchanges 116 with URLs 106. During and/or afterwards, honey monkey module 308 performs an exploit detection procedure to determine if an exploit was accomplished by a URL 106.

The exploit detection procedure is effected, at least in part, by inspecting a trace file created by strider tracer module 310. Strider tracer module 310 is adapted to trace certain events (e.g., operations, actions, etc.) within a given machine (be it a virtual machine or a real machine). For example, the following events may be traced: registry writes, file writes, process creations, some combination thereof, and so forth. When it is ascertained from the trace file that an illicit event has occurred, honey monkey module 308 determines that an exploit has been detected. An example of creation(s), termination(s), interactions, etc. between and among the various components of honey monkey machine 302 is described further below with particular reference to FIG. 4.

Figure 4:
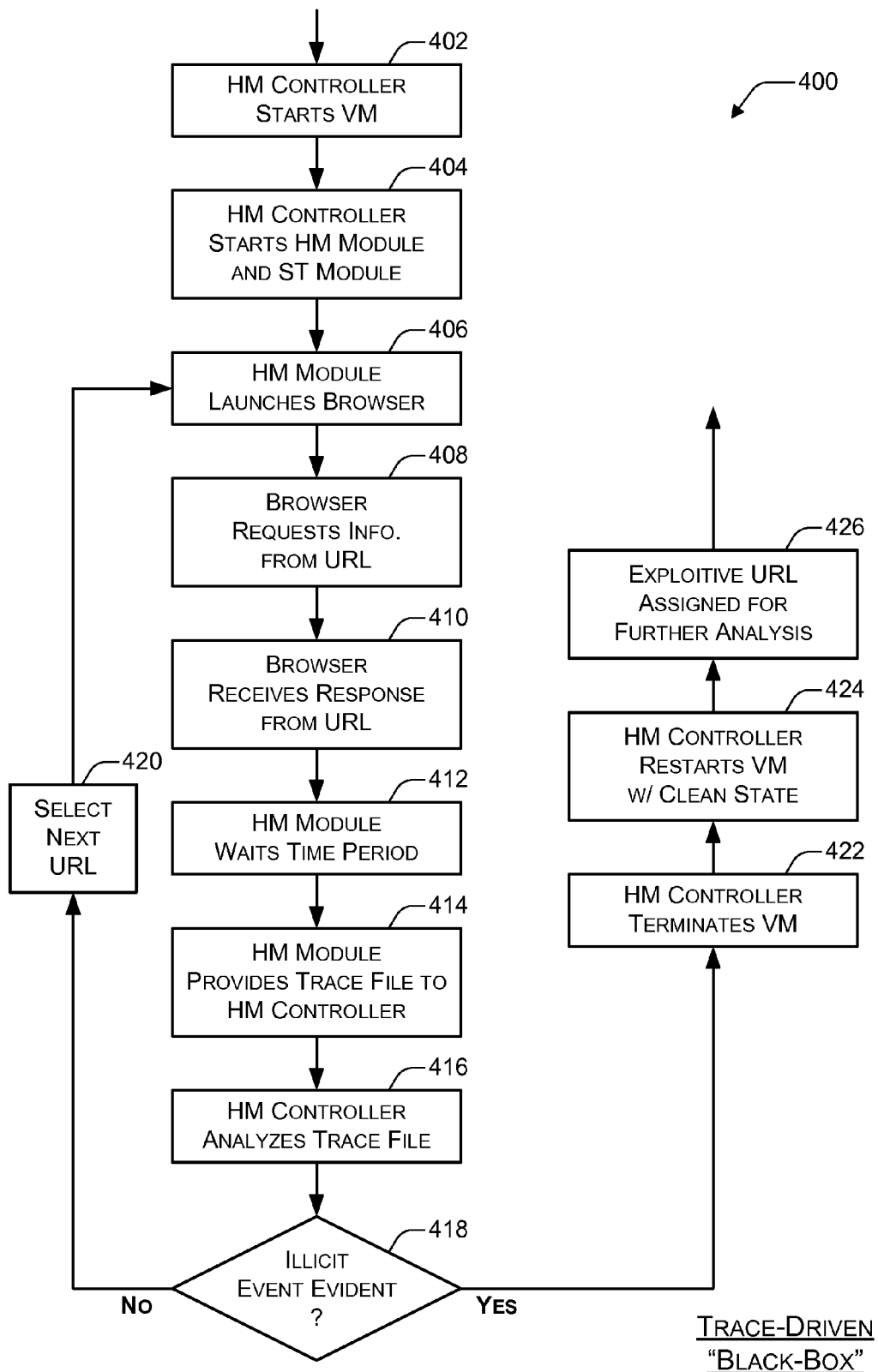
FIG. 4 is a flow diagram that illustrates an example of a method for using a black-box approach to detecting exploits with a honey monkey machine.

FIG. 4 is a flow diagram 400 that illustrates an example of a method for using a black-box approach to detecting exploits with a honey monkey machine. The illustrated black-box approach is trace driven. Flow diagram 400 includes thirteen (13) blocks 402-426. Although the actions of flow diagram 400 may be performed in other environments and with a variety of hardware and software combinations, a honey monkey machine 302 (of FIG. 3) may be used to implement the method of flow diagram 400.

At block 402, a honey monkey (HM) controller starts a virtual machine (VM). For example, a honey monkey controller 304 of a honey monkey machine 302 may start a virtual machine 306(1). At block 404, the honey monkey controller starts a honey monkey module and a strider tracer (ST) module. For example, honey monkey controller 304 may start a honey monkey module 308 and a strider tracer module 310. Alternatively, honey monkey module 308 may be configured to auto-start with the operating system. Strider tracer module 310 begins tracing events within virtual machine 306(1) to create a trace log.

At block 406, the honey monkey module launches a browser. For example, honey monkey module 308 may launch a browser 108. Honey monkey module 308 also provides a URL, such as URL 106(u), to browser 108. A URL list may be provided to honey monkey module 308 from honey monkey controller 304.

At block 408, the browser requests information from the targeted URL. For example, browser 108 may visit URL 106(u) by requesting information from it as part of a request/response exchange 116(u). In an exploit scenario, the browser visitation is likely the result of a redirection, or more specifically a cross-domain auto-visit. At block 410, the browser receives a response from the targeted URL. For example, browser 108 may receive a response from URL 106(u). The response may or may not involve the accomplishment of an exploit 114 (of FIG. 1).

As part of a black-box approach, the honey monkey module waits a predetermined time period at block 412. For example, honey monkey module 308 may wait a predetermined time period such as one minute, two minutes, five minutes, or some other duration. The longer the duration, the greater the likelihood that any intended exploit will be accomplished during the predetermined time period, and thus be efficiently detectable by this black-box approach. On the other hand, the longer the duration of the predetermined time period, the fewer the number of URLs 106 that may be explored each hour, each day, and so forth.

After expiration of the predetermined time period (at block 412), the honey monkey module provides a trace file to the honey monkey controller at block 414. For example, honey monkey module 308 may provide a trace file that is produced by strider tracer module 310 to honey monkey controller 304. At block 416, the honey monkey controller analyzes the trace file that is produced by the strider tracer module. For example, honey monkey controller 304 may inspect a trace file created by strider tracer module 310 to detect the occurrence of events (e.g., file accesses, processing operations, etc.) that extend beyond the bounds of a browser sandbox.

At block 418, it is determined by the honey monkey controller if an illicit event is evident from the trace file. If not, then at block 420 a next URL is selected. For example, honey monkey module 308 may provide another URL 106 to a newly-launched browser 108 (at block 406). A new browser process is launched for each URL so that the process ID can be correlated to the URL in the output trace files because the processes are more easily traceable. If, on the other hand, an illicit event is evidenced from the trace file to have occurred (as determined at block 418), then the method of flow diagram 400 continues at block 422.

At block 422, the honey monkey controller terminates the associated virtual machine. For example, in response to detection of an exploit, honey monkey controller 304 terminates the virtual machine 306(1) that is associated with the honey monkey module 308 that is operating the exploited browser 108. At block 424, the honey monkey controller restarts the virtual machine with a clean state. For example, honey monkey controller 304 may restart the affected virtual machine 306(1) at a state that existed prior to beginning the request/response exchange 116(u) with the responsible URL 106(u).

Furthermore, the virtual machine state may revert all the way back to a state prior to beginning any request/response exchanges 116 that are initiated for a batch of URLs. A batched network exploration approach is described further herein below. Moreover, the virtual machine state may be restarted from a saved fully clean state that existed before any honey monkey-initiated request/responses to avoid the risk of contamination and because restarting from a clean state is relatively fast. When the virtual machine is started from a saved state, the honey monkey module may be suspended in an input wait state.

At block 426, the URL that is responsible for the exploit is assigned for further analysis or other action. For example, recursive redirection analysis may be performed on URL 106(u). Such recursive redirection analysis is described further herein below with particular reference to FIGS. 6-8. Examples of other actions that may be taken to combat an exploitive URL are described herein below with particular reference to FIG. 9.

Example Multi-Phase Exploit Analysis Implementations

Figure 5:
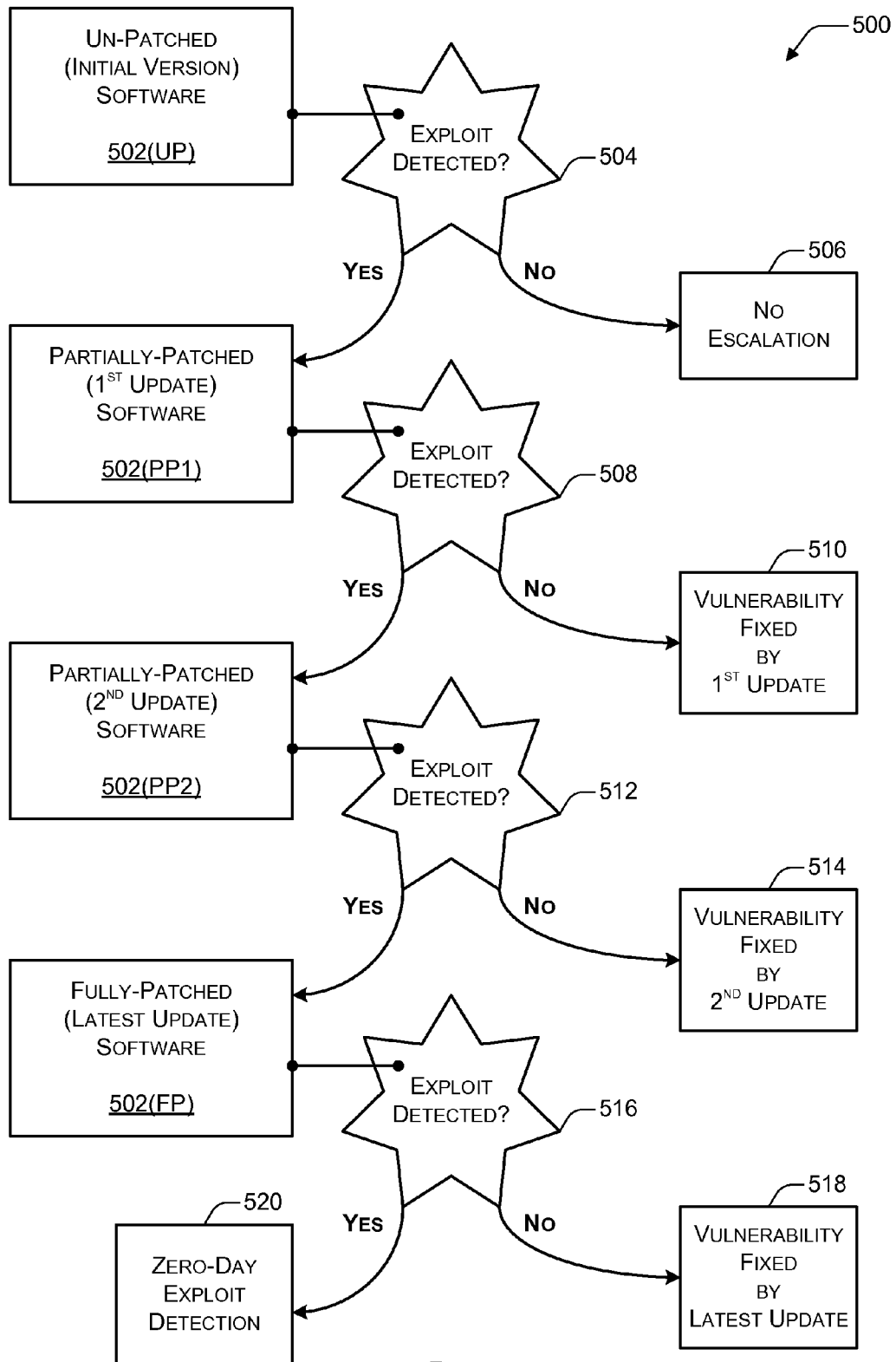
FIG. 5 is a block diagram of an example multi-phase approach to analyzing an exploit using software with different patch levels.

FIG. 5 is a block diagram 500 of an example multi-phase approach to analyzing an exploit using software 502 with different patch levels. Software may be considered to have a life span with different phases. In a first phase, software is issued in an initial version. Typically, a software program in its initial version has multiple vulnerabilities that may be taken advantage of by exploits. The software can be patched to plug or remove these vulnerabilities.

Over the lifetime of a given software program, more than one patch is often issued to update the software multiple times. At each phase or iteration as software migrates from lower patched software versions to higher patched software versions, the software generally becomes less susceptible to exploits and thus more secure. At any given moment, there is a software program having the latest update that may be considered the fully-patched software version.

As illustrated, block diagram 500 includes software 502 in four (4) different versions. These four versions are: un-patched software 502(UP) that is the initial version, partially-patched software 502(PP1) that includes a first update, partially-patched software 502(PP2) that also includes a second update, and fully-patched software 502(FP) that includes the latest update and represents the most recent version. Although four different versions of the software program 502 are illustrated in block diagram 500 and are described herein, fewer than four or more than four different versions may alternatively be in effect for a given software program 502.

Partially-patched software 502(PP1) having the first update is generally less susceptible to exploits than un-patched software 502(UP). Partially-patched software 502(PP2) that has the first and second updates is generally less susceptible to exploits than partially-patched software 502(PP1) that has only the first update. The fully-patched software 502(FP) that has the latest update is generally the least susceptible to exploits.

Software 502 may comprise a browser 108 (of FIGS. 1 and 3), an operating system (not explicitly shown), some other software program, some combination thereof, and so forth. To determine if software 502 is vulnerable to an exploit from a given URL 106, the given URL 106 is visited, and the occurrence of an exploit is detected as described herein. Generally, when a certain exploit is detected, the honey monkey system escalates the investigation of the given URL 106 in phases by visiting it with software 502 having an ever increasing patch level. When a particular patch level is first reached that is not vulnerable to the detected exploit, then it can be inferred that that particular patch level fixes the vulnerability attacked by the detected exploit.

In block diagram 500, a given URL 106 is first visited using un-patched software 502(UP). If an exploit is not detected (at star 504), then no escalation (block 506) is involved because even the most susceptible version of software 502 is not the victim of (i.e., is not successfully attacked by) an exploit. (Or, in most cases, URL 106 is not a malicious URL, so no attack was actually attempted.) If an exploit is detected (at star 504), then the exploit investigation is escalated by using a partially-patched software 502(PP1) version that includes a first update.

Thus, partially-patched software 502(PP1) visits the given URL 106. If an exploit is not detected (at star 508), then it is apparent (at block 510) that the exploited vulnerability in software 502 is fixed by the first update. If an exploit is detected (at star 508), then the exploit investigation is further escalated at yet another phase by using a partially-patched software 502(PP2) version that includes a second update, which incorporates the first update in this example.

Thus, partially-patched software 502(PP2) that includes the second update visits the given URL 106. If an exploit is not detected (at star 512), then it is apparent (at block 514) that the exploited vulnerability in software 502 is fixed by the second update. If an exploit is detected (at star 512), then the exploit investigation is further escalated by using a fully-patched software 502(FP) version that includes the latest update.

Thus, fully-patched software 502(FP) that includes the latest update visits the given URL 106. If an exploit is not detected (at star 516), then it is apparent (at block 518) that the exploited vulnerability in software 502 is fixed by the latest update. If an exploit is detected (at star 516), then it is apparent that a so-called zero-day exploit has been detected (at block 520). A zero-day exploit is considered to be an exploit that exists before the patch for the exploited vulnerability is released. The vulnerability related to the zero-day exploit can be known or unknown generally (e.g., to the public) at the time of detecting the zero-day exploit.

Example Implementations of Analyses of Sites Involved in Exploits

Figure 6:
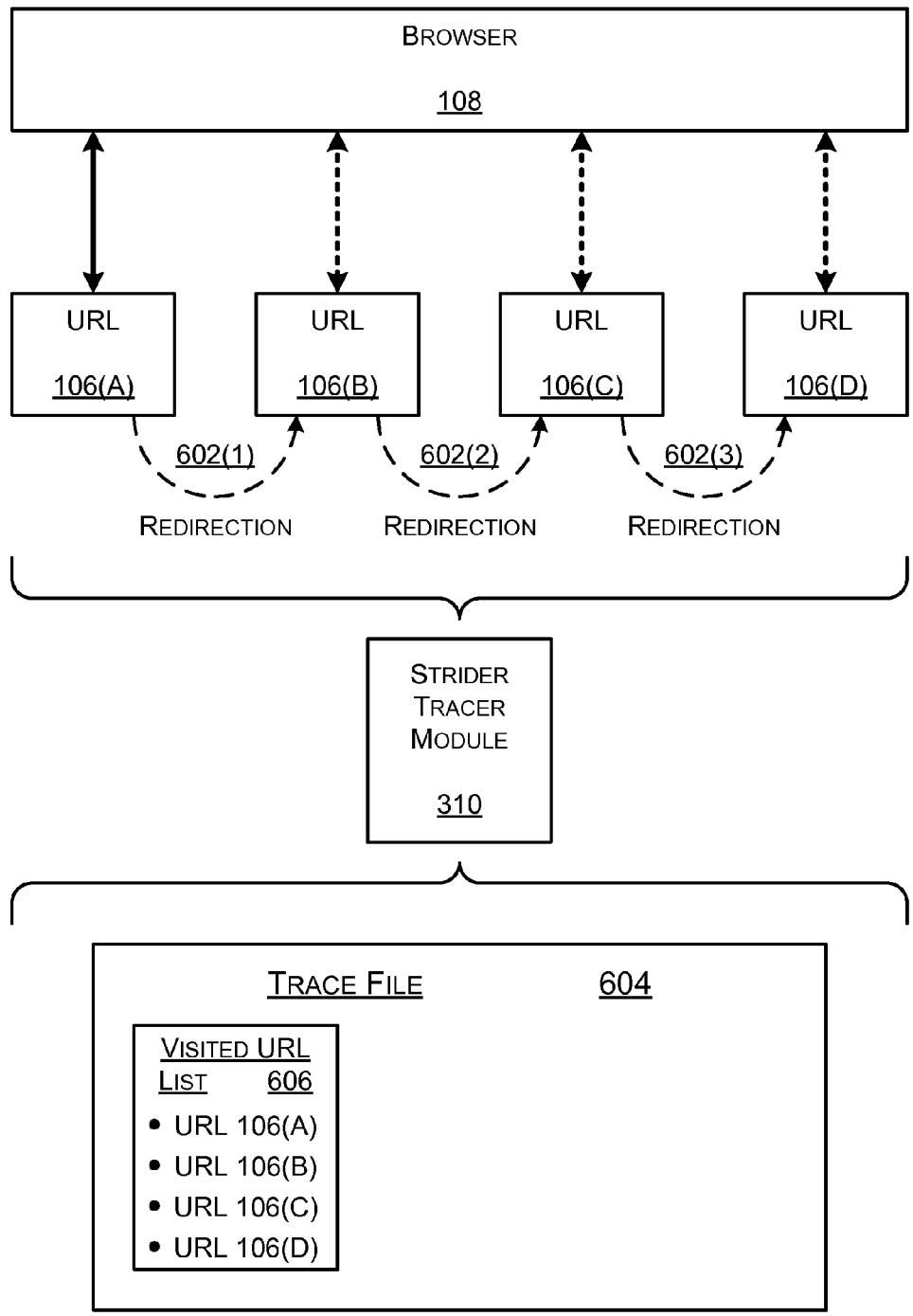
FIG. 6 is a block diagram of an example site visitation trace mechanism for a strider tracer module.

FIG. 6 is a block diagram of an example site visitation trace mechanism 600 for a strider tracer module 310. As illustrated, browser 108 visits four (4) sites as represented by URLS 106(A), 106(B), 106(C), and 106(D). These site visitations include three (3) redirections 602(1), 602(2), and 602(3). Strider tracer module 310 is capable of tracing these four (4) site visitations and producing trace file 604. Trace file 604 includes, possibly in addition to other events that have been traced, a visited URL list 606 having four entries. These four entries are URL 106(A), URL 106(B), URL 106(C), and URL 106(D).

In a described implementation, strider tracer module 310 traces the actions that occur within the machine, including URL redirections. Alternatively, the URL redirections may be traced by a separate module, or they may be separated into sub-modules, and so forth. Regardless, URL tracing may be accomplished at any of several possible layers. Examples include implementing the URL tracer as a DLL that loads into the browser and implementing the URL tracer as a proxy, which may be implemented as a service or some separate executable. For instance, a proxy may register itself with the system and have browser http requests routed through the proxy. Another example is implementing and installing a Winsock Layered Service provider, which is a type of DLL. This provider intercepts network traffic on the machine and inspects and traces the traffic generated from the browser. Another example is implementing a driver that intercepts network traffic at the kernel level.

Site redirection is a browser concept that enables a browser to be redirected from one site to one or more other sites. It is capable of providing modularity on the internet. The redirection may occur without the authorization, or even knowledge, of the user. Especially when the site redirection occurs without the knowledge of the user, redirection may be more precisely termed a "cross-domain auto-visit". For most exploit scenarios, the page content stays at the URL to which the user originally directed a browser while the other URL(s) are being auto-visited by the browser under the cover. Although there are legitimate purposes to redirection that benefit web site operators and browser users alike, site redirection can also be used for nefarious purposes. For example, it is often used by exploit providers to hide their identity and/or make exploit detection more difficult to track and prevent. The exploit "experts" pay provider sites to redirect clients to their exploitive sites. Malware development companies then pay exploiters to install their software.

As illustrated, browser 108 is directed by a user to visit URL 106(A). The information (e.g., hypertext markup language (HTML) data) that is received from URL 106(A) causes browser 108 to be redirected 602(1) to URL 106(B). The information received from URL 106(B) causes browser 108 to be redirected to URL 106(C). The information received from URL 106(C) causes browser 108 to be redirected to URL 106(D). One or more of these URLs 106(A), 106(B), 106(C), and 106(D) may attempt (whether or not successfully) to accomplish an exploit. Although not so illustrated by the redirection chain of FIG. 6, information received from a single URL 106 may cause multiple redirections 602 to multiple other URLs 106. Situations in which a single URL 106 initiates multiple auto-visits of other URLs may be envisioned as a branching tree of redirections. These are also handled by site visitation trace mechanism 600 with strider tracer module 310.

As described herein above, strider tracer module 310 traces events that occur within a system. These events are logged into trace file 604. In addition to file reads/writes, registry changes, etc., strider tracer module 310 traces the sites that are visited by browser 108. It traces URLs 106 that are visited directly and those that are visited indirectly via redirections 602. These traced sites are included in visited URL list 606 as part of trace file 604. The traced sites may be further divided between directly-visited sites (e.g., URL 106(A)) and indirectly-visited or redirected sites (e.g., URLs 106(B), 106(C), 106(D)). Also, each may be listed separately, directly-visited sites may be excluded, and so forth.

By further investigating the URLs 106 included within URL list 606, site (and page) interrelationships can be gleaned. The knowledge of such interrelationships can be magnified if combined with other visited URL lists 606 from other trace files 604. Moreover, the complexity of interrelationships between content providers and exploit providers can be further illuminated if visited URL lists 606 are recursively analyzed.

For example, each URL 106 that is listed in visited URL list 606 can be fed back into the honey monkey system in order to direct a browser 108 to visit each of them. Visitation of each of these URLs 106 produces a new visited URL list 606. These new visited URL lists 606 are likewise visited. This recursive process continues for each branch until URLs that are included on a visited URL list 606 does not produce any redirections. The result is a dynamically generated tree in which each node is visited down each branch until each leaf is reached. Such a tree may be traversed depth first or breadth first.

In other words, visiting each URL 106 on a visited URL list 606 creates another visited URL list 606. For this reason, generational terminology (e.g., parent-child-grandchild) is adopted to describe in greater detail this recursive analysis of visited URL lists 606. More specifically, an initial visited URL list 606 that is generated from a general pool of URLs is termed the parent visited URL list. Visited URL lists that are generated by visiting individual URLs 106 on the parent visited URL list are termed child visited URL lists. The URLs listed on the child visited URL lists are termed child URLs. Visited URL lists that are generated by visiting individual child URLs 106 on a child visited URL list are termed grandchild visited URL lists that are populated with grandchildren URLs. The process continues recursively until a child, grandchild, great-grandchild, etc. does not beget another visited URL list 606.

Figure 7:
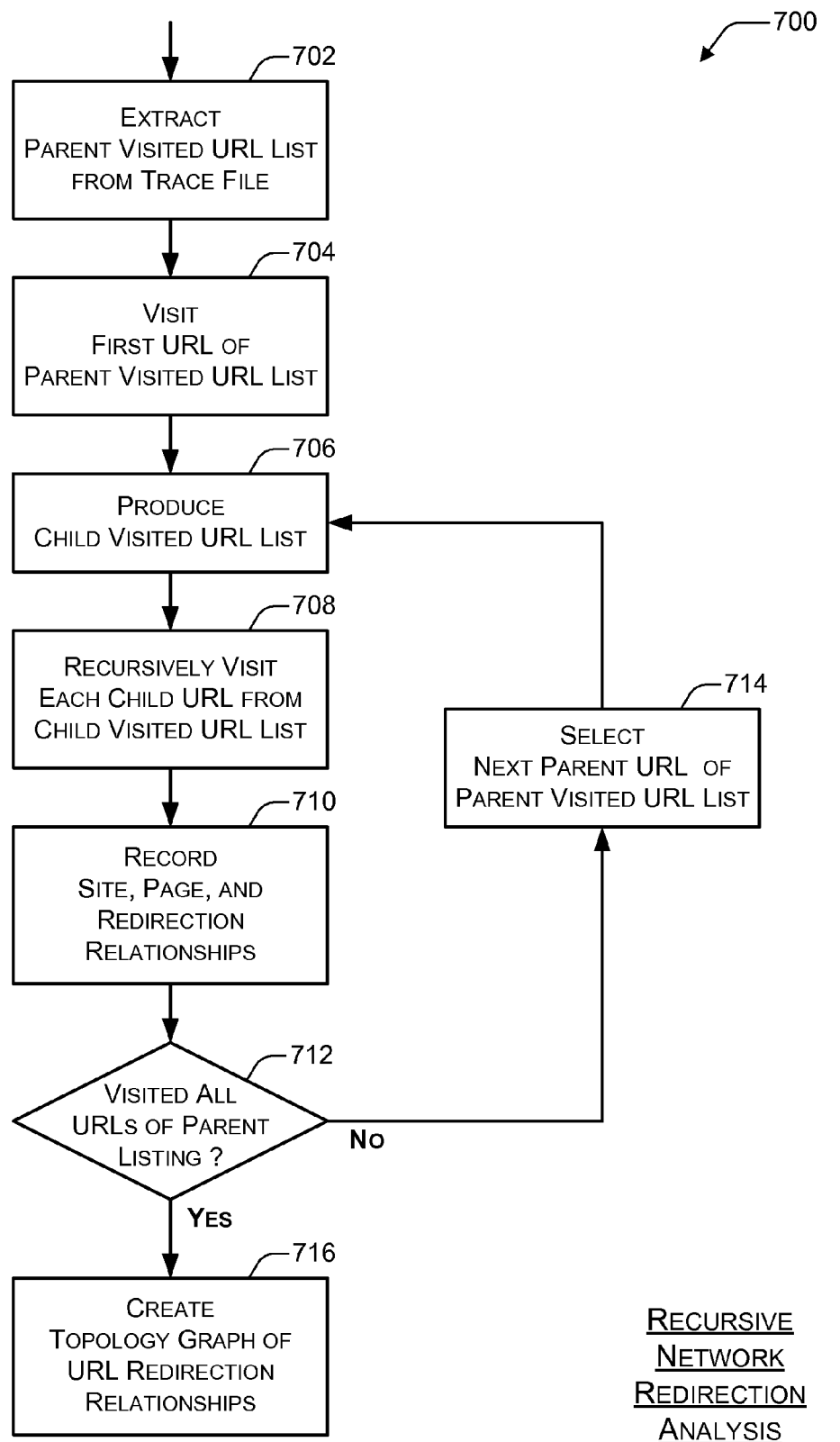
FIG. 7 is a flow diagram that illustrates an example of a method for generating a topology graph that shows relationships between and among sites that are involved in exploit behavior.

FIG. 7 is a flow diagram 700 that illustrates an example of a method for generating a topology graph that shows relationships between and among sites that are involved in exploit behavior. Flow diagram 700 includes eight (8) blocks 702-716. Although the actions of flow diagram 700 may be performed in other environments and with a variety of hardware and software combinations, a site visitation trace mechanism 600 (of FIG. 6) is used to further illuminate the method of flow diagram 700. Flow diagram 700 is a recursive method that takes a visited URL list 606 and deems it a parent visited URL list that can be used to create children visited URL lists.

At block 702, a parent visited URL list is extracted from a trace file. For example, a visited URL list 606 may be extracted from a trace file 604. At block 704, the first URL of the parent visited URL list is visited. In this example, the parent visited URL list is divided between directly-visited site(s) and indirectly-visited or redirected site(s). When focusing on the redirections in a recursive analysis, the directly-visited site is ignored and the first redirected site in the listing is visited. In accordance with the example of FIG. 6, the site of URL 106(B) is thus visited for block 704.

At block 706, a child visited URL list is produced. For example, a child visited URL list (not separately shown) is produced as a result of directly visiting URL 106(B) of the parent visited URL list 606. At block 708, each child URL of the child visited URL list is recursively visited, too. In other words, each visited child URL may beget a grandchild visited URL list that includes one or more grandchildren URLs. The sites listed on the grandchildren URL lists that are created by visiting each child URL of the child visited URL list are also visited. The recursive process continues until each child URL, grandchild URL, great-grandchild URL, etc. does not beget another visited URL list 606.

At block 710, site, page, and redirection relationships are recorded. For example, the sites that are visited, the pages that they host or serve, and the redirections between and among them may be stored into memory for subsequent manipulation (e.g., automated analysis, graphing of the data, etc.).

At block 712, it is determined if all of the parent URLs of the parent visited URL list have been visited. If not, then the next parent URL of the parent visited URL list is selected (at block 714) and the method of flow diagram 700 continues from block 706.

If, on the other hand, all of the parent URLs of the parent visited URL list have been visited (as determined at block 712), then a topology graph of URL redirection relationships is created at block 716. For example, the site redirections 602 between and among different sites and their hosted pages may be indicated in a topology graph. Sites may be identified as being content provider sites or exploit provider sites. An example topology graph is described below with particular reference to FIG. 8.

Figure 8:
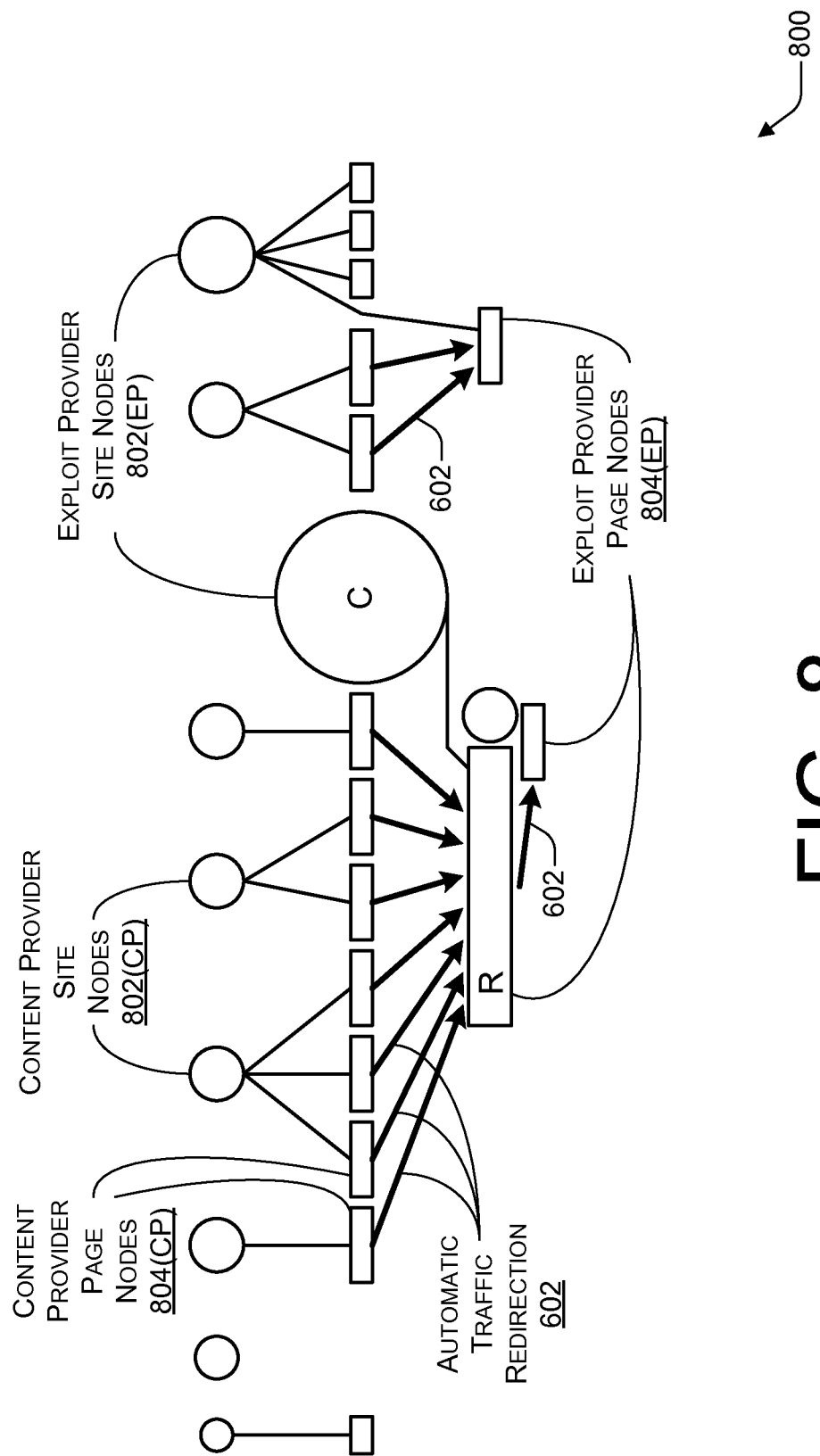
FIG. 8 is an example exploit topology graph showing relationships between and among sites that are involved in exploit behavior.

FIG. 8 is an example exploit topology graph 800 showing relationships between and among sites that are involved in exploit behavior. As illustrated, topology graph 800 includes site nodes 802 that are represented by circles and page nodes 804 that are represented by rectangles. Redirections are represented by thick arrows 602. There are content provider site nodes 802(CP) and exploit provider site nodes 802(EP). There are also content provider page nodes 804(CP) and exploit provider page nodes 804(EP).

Generally, page nodes may be differentiated from site nodes by varying the shape, color, size, some combination thereof, etc. of the symbols representing the nodes. Also, the serving relationship between sites and pages may be differentiated from redirection relationships by line style, by color, by line thickness, by some combination thereof, and so forth. Other connection relationships may be similarly indicated and/or differentiated. The number of connection relationships (e.g., serving, redirection, etc.) between nodes, both connecting to a given node and emanating therefrom, may be indicated by the node symbol. In the illustrated topology graph 800, the size of the symbol indicates this overall connectedness, but other changes to the symbols may alternatively be employed.

Specifically, topology graph 800 is actually indicative of an example real-world analysis of interrelationships between sites and pages that are involved in exploits. Specifically, there were 17 exploit-URLs layered over 10 sites. Rectangular nodes 804 represent individual exploit-URLs. Thick solid arrows between rectangles represent automatic traffic redirections 602. Circles represent site nodes 802 that act as an aggregation point for all exploit pages hosted on that site, with each site node 802 having a relatively thinner edge or line connecting each of its hosted child-page rectangles 804. Page nodes 804(CP) that do not receive redirected traffic are most likely those of content providers. Page nodes 804(EP) that do receive traffic from multiple exploit sites (e.g., the large rectangle R near the bottom of the graph) are most likely those of exploit providers.

The size of a node is proportional to the number of cross-site arrows directly connected to it, both incoming and outgoing. Such size/numbers provide a good indication of the relative popularity of exploit-URLs and sites. This popularity measure is referred to as being based on connection counts. It is clear from the picture that the large rectangle R and its associated circle C have the highest connection counts. Consequently, blocking access to such a site would likely be the most effective starting point for combating malware realized from the analyzed URLs because it would disrupt nearly half of the exploit network graphed in FIG. 8.

Two example ranking algorithms that help prioritize the investigations of large-scale topology graphs are described. Examples of such large-scale topology graphs are those with hundreds, thousands, or even more URLs and/or sites. Site-ranking can be based on connection counts and/or on the number of hosted exploit-URLs.

With respect to site-ranking based on connection counts, each site may be ranked according to the number of connections to and from a site. With a bar graph, for example, a bar height for a given site indicates how many other sites the given site has a direct traffic-redirection relationship with. Hence, the bar height likely reflects how entrenched a site owner is within the exploit community.

By way of example only, the bar for a given site may also be divided into segments of different filling (e.g., pattern and/or color). For instance, a segment of a first color may represent the number of sites that redirect traffic to the given site. A segment of a second color represents the number of sites to which traffic is redirected from the given site. A segment of a third color indicates the number of sites that have a two-way traffic redirection relationship with the given site.

Site ranking, categorization, and grouping can play a key role in the anti-exploit process because they serve as the basis for deciding the most effective resource allocation for monitoring, investigating, blocking, and legal actions. For example, exploit sites that are highly-ranked in a site-ranking graph should be heavily monitored because a zero-day exploit page connected to any one of them is likely to affect a large number of web sites. Similarly, legal investigations should focus on the top exploit providers, rather than on the content providers that are mere traffic redirectors and do not actually perform exploits themselves.

With respect to site-ranking based on the number of hosted exploit-URLs, each site often hosts more than one exploit URL. On a bar graph for example, each site may have a bar entry with the size of the bar dependent on the number of hosted exploit-URLs. This type of ranking helps highlight those web sites whose internal page hierarchy provides important exploit-provider operational insights. First, some web sites host a large number of exploit pages with a well-organized hierarchical structure. Second, some "sophisticated" web sites use transient URLs that contain random strings.

A Specific Example Multi-Stage Implementation for a Honey Money Exploit Detection System The described example specific honey monkey exploit detection system attempts to automatically detect and analyze a network of web sites that exploit web browsers. Aspects of the specific example system described in this section may also be incorporated into the example implementations described herein above.

Figure 9:
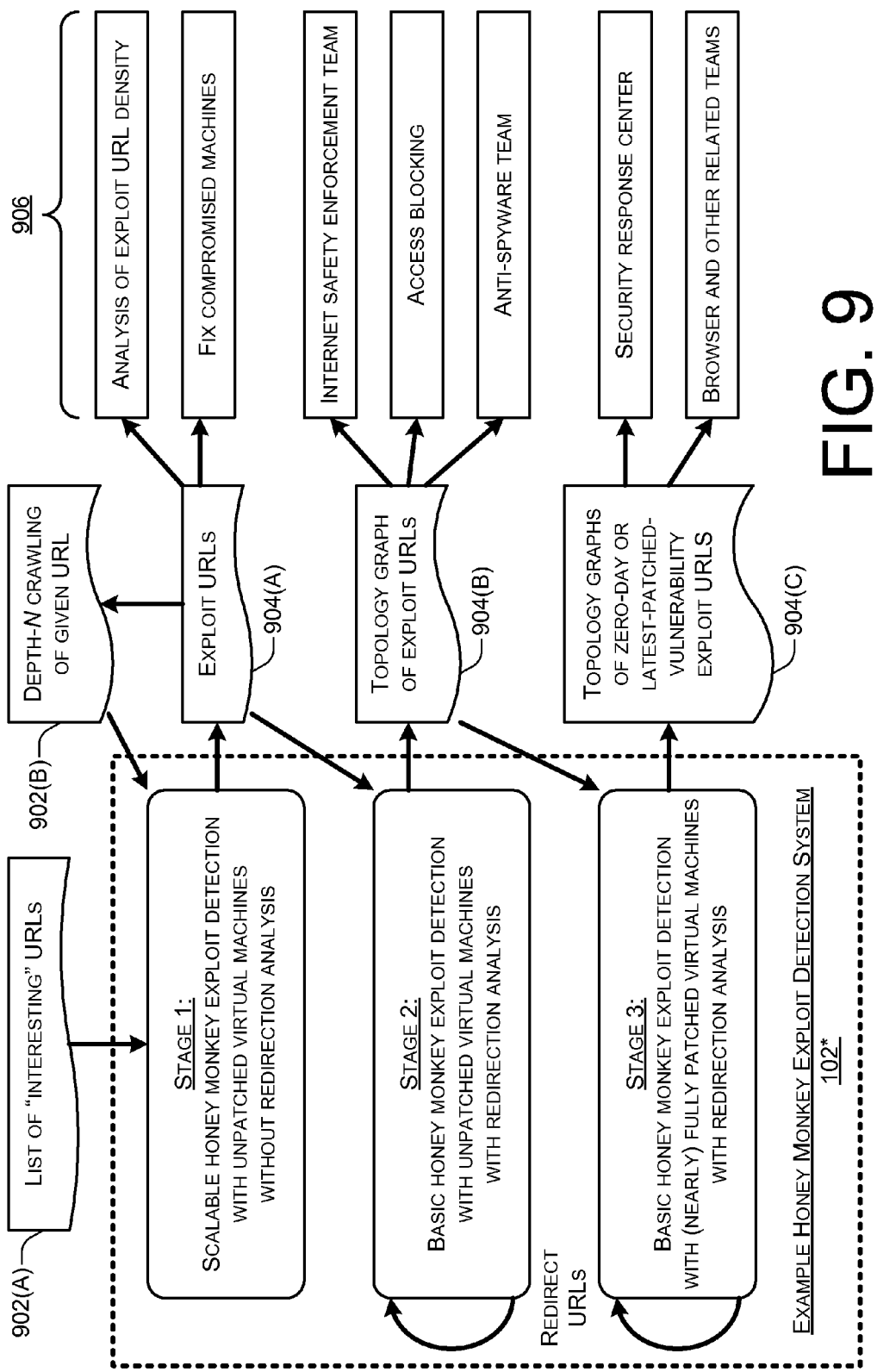
FIG. 9 illustrates an example honey monkey exploit detection system, which is shown inside the dashed-line rectangle, and a surrounding anti-exploit process, which includes both automatic and manual components.

FIG. 9 illustrates an example honey monkey exploit detection system 102*, which is shown inside the dashed-line rectangle, and a surrounding anti-exploit process, which includes both automatic and manual components 906. In a described implementation, honey monkey exploit detection system 102* includes three stages and receives inputs 902 and produces outputs 904. Multiple example components of an anti-exploit process are shown at 906.

As illustrated, honey monkey exploit detection system 102* receives a list of "interesting" URLs as input 902(A) as well as a semi-recursive depth-N crawling of a given exploit URL input 902(B). Three outputs 904 are also shown. These three outputs are: exploit URLs output 904(A), topology graph of exploit URLs 904(B), and topology graphs of zero-day or latest-patched-vulnerability exploit URLs 904(C).

Browser-based Vulnerability Exploits

By way of example only, malicious activities performed by actual web sites exploiting browser vulnerabilities can be divided into four steps: code obfuscation, URL redirection, vulnerability exploitation, and malware installation.

Code Obfuscation: To complicate investigation and to escape signature-based scanning by anti-virus/anti-spyware software, some web sites use a combination of the following code obfuscation techniques: (1) dynamic code injection using the document.write() function inside a script; (2) unreadable, long strings with encoded characters such as "%28", "h", etc. that are then decoded either by the unescape() function inside a script or by the browser; (3) custom decoding routine included in a script; and (4) sub-string replacement using the replace() function. Because code-obfuscation is a common technique, it limits the ability of attack-signature-based detectors to detect new attacks that leverage old exploit code.

URL Redirection: Most malicious web sites automatically redirect browser traffic to additional URLs. Specifically, when a browser visits a primary URL, the response from that URL instructs the browser to automatically visit one or more secondary URLs. This redirection may or may not affect the content that is displayed to the user. Such redirections typically use one of the following mechanisms classified into three categories: (1) protocol redirection using HTTP 302 Temporary Redirect; (2) HTML tags including <iframe>, <frame> inside <frameset>, and <META http-equiv=refresh>; (3) script functions including window.location.replace(), window.location.href(), window.open(), window.showModalDialog(), and <link ID>.click() and so forth. Because redirection is commonly used by non-malicious sites to legitimately enrich content, simply eliminating redirection from a browser's functionality would present significant complications.

Vulnerability Exploitation: It is not uncommon to see a malicious web page attempting to exploit multiple browser vulnerabilities in order to maximize the chance of a successful attack. If any of the attempted exploits succeed, malware may be downloaded and executed. Examples of malware include a "Trojan downloader", a virus, spyware, and so forth.

Malware Installation: The purpose of an exploit is almost always to introduce some piece of arbitrary code on the victim machine, as a way to achieve a larger attack goal. There are many different malcode types that are installed through browser exploits including, but not limited to, viruses that infect files, backdoors that open entry points for future unauthorized access, bot programs that allow the attacker to control a whole network of compromised systems, Trojan downloaders that connect to the Internet and download other programs, Trojan droppers that drop files from themselves without accessing the Internet, and Trojan proxies that redirect network traffic. Some spyware programs, and even anti-spyware programs, are also installed through exploit behavior.

Exploit Detection System

The example honey monkey exploit detection system 102\* comprises a 3-stage pipeline of virtual machines (VMs). Stage 1 is scalable honey monkey exploit detection with unpatched VMs and without redirection analysis. Stage 2 is basic (i.e., unscaled) honey monkey exploit detection with (at least partially) un-patched VMs and with redirection analysis. Stage 3 is basic honey monkey exploit detection with nearly fully-patched VMs and with redirection analysis. Fully-patched VMs may also be used to detect true zero-day exploits.

Given a large list of input URLs 902(A) with a potentially low exploit-URL density, each honey monkey in Stage 1 starts in a scalable mode by visiting "N" URLs simultaneously inside one unpatched VM. The simultaneous visitation may be considered a batched or grouped approach to visiting "N" URLs. When the honey monkey VM detects an exploit, it switches to a basic, one-URL-per-VM mode to re-test each of the N suspects in the batch so as to determine which one or ones are actually exploit URLs 904(A).

Stage 2 honey monkeys scan those exploit-URLs that are detected from Stage 1 honey monkeys. Stage 2 honey monkeys also perform recursive redirection analysis to identify multiple (up to all) web pages involved in exploit activities and to determine their relationships. Stage 3 honey monkeys continuously scan those exploit-URLs that are detected in Stage 2 using (nearly) fully-patched honey monkey VMs so as to detect attacks exploiting the latest vulnerabilities.

Exploit Detection

Although it is possible to detect browser exploits by building signature-based detection code for each known vulnerability or exploit, this approach is manually intensive (and may be unsuitable to the detection of zero-day exploits). To reduce manual costs, a black-box approach that is not signature-based is adopted. More specifically, a honey monkey module launches a browser instance to visit each input URL and then waits for a few minutes to allow downloading of any code that may have a short time delay before installation.

A group of persistent-state changes is then detected to signal exploitation. Because the honey monkey is not instructed to click on any dialog box to permit software installation, any executable files or registry entries created outside the browser sandbox indicate an exploit. This approach has the additional important advantage of allowing the detection of both known-vulnerability exploits and zero-day exploits in a uniform way. For instance, the same honey monkey module running on un-patched machines to detect a broad range of browser-based vulnerability exploits (as shown in Stages 1 and 2) can run on fully-patched machines to detect zero-day exploits, as shown in Stage 3.

At the end of each URL visit, the honey monkey module, in conjunction with a strider tracer module, generates a report (e.g., in XML). The report may contain many different types of information. By way of example only, all or part of the following five pieces of information may be included:

(1) Executable files created or modified outside the browser sandbox folders: This is the primary mechanism for exploit detection. It is implemented on top of the strider tracer module, which uses a file-tracing driver to efficiently record up to every single file read/write operation.
(2) Processes created: The strider tracer module also tracks all child processes created by the browser process.
(3) Windows registry entries created or modified: The strider tracer module additionally includes a driver that efficiently records up to every single registry read/write. To highlight the most critical entries, the registry entries most frequently attacked by spyware, Trojans, rootkits, etc. may be targeted. This allows the honey monkey module to detect exploits that modify critical configuration settings (such as the browser home page and the wallpaper) without creating executable files.
(4) Vulnerability exploited: This provides additional information generally. To address limitations of the black-box approach, a vulnerability-specific exploit detector may also be incorporated. A detector may be based on the vulnerability signature of the exploit, rather than on a particular piece of malcode.
(5) Redirect-URLs visited: Because malcode is often laundered through other sites, this aspect enables the tracking of redirections to determine both the real source of the malcode and those involved in the distribution chain.

To ease the cleanup from an infected state, the honey monkey modules are run inside one or more VMs. Upon detecting an exploit, the honey monkey saves its logs and notifies a monkey controller on the host machine. The monkey controller destroys the infected VM and re-spawns or re-instantiates a clean VM and honey monkey module, which then continues to visit the remaining URL list. The monkey controller then passes the detected exploit-URL to the next honey monkey module in the staged pipeline to further investigate the strength of the exploit.

Redirection Analysis

In a described implementation, many exploit-URLs that are identified in Stage 1 do not perform the actual exploits. Instead, they act as front-end content providers that serve interesting content in order to attract browser traffic. This traffic is then sold and redirected to back-end exploit providers, which specialize in exploiting clients and installing malware.

URLs visited through traffic redirection can be tracked with a "Browser Helper Object' (BHO) running within each browser process or by intercepting and analyzing network packets. When a honey monkey module runs in its "redirection analysis" mode, any automatically visited URLs are fed back to the system for further investigation. This recursive scanning allows the construction of topology graphs based on traffic redirection. Topology graphs may graph different types of URLs, such as exploit URLs generally 904(B), zero-day or latest-patched-vulnerability exploit URLs 904(C), some combination thereof, and so forth.

Analysis of topology graphs enables the identification of major exploit providers that receive traffic from a large number of content providers. They also show how exploit providers organize their web pages in a way that facilitates customized malware installations for each of their affiliates. Finally, the web pages that actually perform the exploits may be positively identified by activating an optional feature in the redirection tracker to block all redirection traffic. More specifically, singular URLs that are included as part of a list of redirection URLs may be individually visited by activating a redirection blocking feature, which ensures that only the intended URL is directly visited. Thus, single URLs may be selectively and sequentially visited to determine whether or not each particular page is responsible for performing an exploit.

Anti-Exploit Process

An example anti-exploit process involves generating input URL lists 902(A) for honey monkey modules to scan and taking various actions based on analyses of the output exploit-URL data 904(A).

Generating Input URL Lists

In a described implementation, three sources are used for generating "interesting" URLs 902(A) for analysis. The first category is directed to suspicious URLs. Examples include web sites that are known to host spyware or malware, links appearing in phishing or spam emails or instant messages, web pages serving questionable content such as pornography, URL names that are typos of popular sites, web sites involved in DNS cache poisoning, and similar common sources of malicious web content.

The second category is directed to the most popular web pages. These web pages, if compromised, can potentially infect a large population of users. Examples include the top 100,000 web sites based on browser traffic ranking or the top "N" million web sites based on click-through counts as measured by search engines.

The third category is directed to URL lists of a more localized scope. For example, an organization may want to regularly verify that its web pages have not been compromised to exploit visitors. Also, a user may want to investigate whether any recently visited URL was responsible for causing a spyware infection.

Acting on Output Exploit-URL Data

There are many options available to combat exploit behavior. Of course, some are more effective than others, especially depending on the exploit context and the resources that are available. Example anti-exploit options are presented in FIG. 9 at 906.

Firstly, exploit URLs 904(A) may be used in an analysis of exploit URL density or to fix compromised machines. Secondly, topology graphs of exploit URLs 904(B) may be provided to an internet safety enforcement team and/or to an anti-spyware team. They may also be used for access blocking to block access to the exploitive URLs. Thirdly, topology graphs of zero-day or latest-patched-vulnerability exploit URLs 904(C) may be forwarded to a security response center as well as to browser or related software teams.

Example Device Implementations for Honey Monkey Network Exploration

Figure 10:
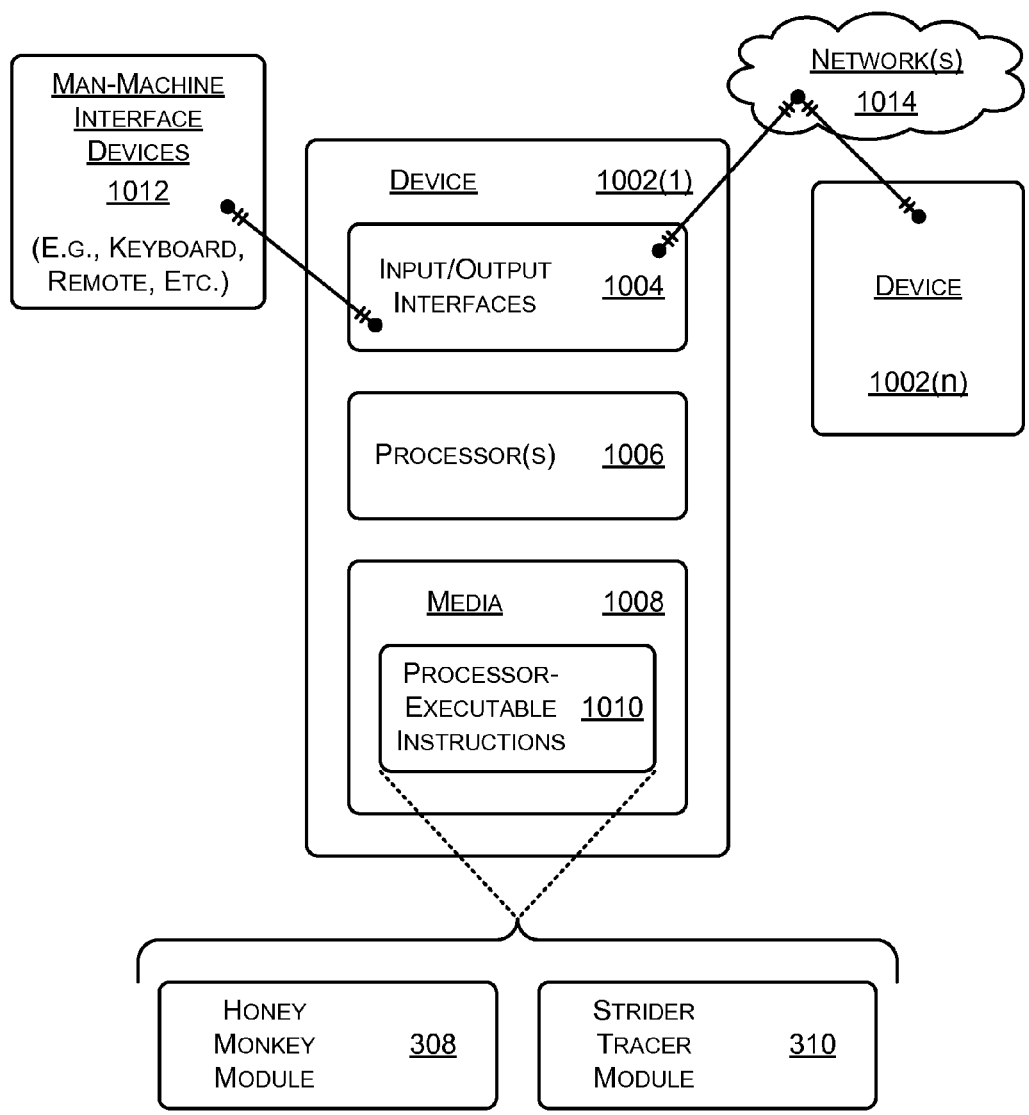
FIG. 10 is a block diagram of an example device that may be employed in conjunction with honey monkey network exploration.

FIG. 10 is a block diagram of an example device 1002 that may be employed in conjunction with honey monkey network exploration. For example, a device 1002 may realize, execute, or otherwise implement a honey monkey system 102. In certain implementations, devices 1002 are capable of communicating across one or more networks 1014, such as an internet, a local area network (LAN), a telephone network, some combination thereof, and so forth. As illustrated, two devices 1002(1) and 1002(n) are capable of engaging in communication exchanges via network 1014. Example relevant communication exchanges include those relating to visiting a network location represented by a URL 106, such as a request/response exchange 116.

Generally, device 1002 may represent a server device; a storage device; a workstation or other general computer device; a set-top box or other television device; a personal digital assistant (PDA), mobile telephone, or other mobile appliance; an electronic machine generally, some combination thereof; and so forth. As illustrated, device 1002 includes one or more input/output (I/O) interfaces 1004, at least one processor 1006, and one or more media 1008. Media 1008 includes processor-executable instructions 1010. Although not specifically illustrated, device 1002 may also include other components.

In a described implementation of device 1002, I/O interfaces 1004 may include (i) a network interface for communicating across network(s) 1014, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a screen/television or printer, and so forth. Examples of (iii) man-machine device interfaces include those that communicate by wire or wirelessly to man-machine interface devices 1012 (e.g., a keyboard or keypad, a mouse or other graphical pointing device, a remote control, etc.).

Generally, processor 1006 is capable of executing, performing, and/or otherwise effectuating processor-executable instructions, such as processor-executable instructions 1010. Media 1008 is comprised of one or more processor-accessible media. In other words, media 1008 may include processor-executable instructions 1010 that are executable by processor 1006 to effectuate the performance of functions by device 1002.

Thus, realizations for honey monkey network exploration may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1006 may be implemented using any applicable processing-capable technology. Media 1008 may be any available media that is included as part of and/or accessible by device 1002. It includes volatile and non-volatile media, removable and non-removable media, and storage and transmission media (e.g., wireless or wired communication channels). For example, media 1008 may include an array of disks for longer-term mass storage of processor-executable instructions, random access memory (RAM) for shorter-term storage of instructions that are currently being executed, flash memory for medium to longer term storage, optical disks for portable storage, and/or link(s) on network 1014 for transmitting code or communications, and so forth.

As specifically illustrated, media 1008 comprises at least processor-executable instructions 1010. Generally, processor-executable instructions 1010, when executed by processor 1006, enable device 1002 to perform the various functions described herein. Examples include, but are not limited to, those of a honey monkey system 102 or 102\* (of FIGS. 1 and 9); those of a site visitation trace mechanism 600 (of FIG. 6); those of flow diagrams 200, 400, and 700 (of FIGS. 2, 4, and 7); a multi-phase approach such as in block diagram 500 (of FIG. 5), some combination thereof, and so forth. As illustrated in FIG. 10, processor-executable instructions 1010 may also include a honey monkey module 308 and/or a strider tracer module 310 (of FIG. 3)

The machines, devices, actions, aspects, features, functions, procedures, modules, data structures, schemes, approaches, phases, stages, architectures, components, etc. of FIGS. 1-10 are illustrated in diagrams that are divided into multiple blocks. However, the order, interconnections, interrelationships, layout, etc. in which FIGS. 1-10 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for honey monkey network exploration.

Although systems, media, devices, methods, procedures, apparatuses, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more processor-accessible storage devices comprising instructions that are executable by one or more processors to perform actions comprising:
   visiting a uniform resource locator (URL) of a parent list of redirection URLs;
   producing a child list of redirection URLs based on visiting the URL of the parent list of redirection URLs, the child list of redirection URLs including a plurality of child URLs;
   recursively visiting the child URLs of the child list of redirection URLs to discover redirection relationships between the child URLs that are visited; and
   creating a graph that includes the child URLs that are visited and that indicates the redirection relationships between the child URLs.

2. The one or more processor-accessible storage devices as recited in claim 1, wherein the actions further comprise:
   visiting a given URL;
   monitoring URL redirections resulting from visiting the given URL; and
   tracing the URL redirections to produce the parent list of redirection URLs.

3. The one or more processor-accessible storage devices as recited in claim 1, wherein site nodes and page nodes of the graph are visually differentiated.

4. The one or more processor-accessible storage devices as recited in claim 1, wherein creating the graph comprises:
   representing URLs with corresponding symbols; and
   visually indicating a number of redirections that are associated with each of the URLs by changing the corresponding symbols.

5. The one or more processor-accessible storage devices as recited in claim 1, wherein creating the graph comprises visually differentiating between connections that represent relationships between site nodes and page nodes hosted by the site nodes and connections that represent redirection relationships.

6. The one or more processor-accessible storage devices as recited in claim 1, wherein the actions further comprise:
   visiting each respective URL of the parent list of redirection URLs;
   producing respective child lists of redirection URLs from visiting each respective URL of the parent list of redirection URLs; and
   recursively visiting child URLs of the respective child lists of redirection URLs to discover redirection relationships between the child URLs that are visited.

7. The one or more processor-accessible storage devices as recited in claim 1, wherein the topology graph identifies content provider URLs and exploit provider URLs.

8. The One or more processor-accessible storage devices of claim 1, wherein the parent list of redirection URLs, and the child list of redirection URLs, include URLs that a content location instructs a browser to auto-visit.

9. The one or more processor-accessible storage devices of claim 1, wherein the actions include forming the redirection relationships between the child URLs by a first content of a first one of the child URL including an instruction to a browser to auto-visit second content of a second one of the child URLs.

10. a system comprising:
    one or more processors; and
    one or more processor-accessible storage media storing:
       a trace file;
       a browser; and
       a strider tracer module including instructions executable by the one or more processors to:
          determine a given uniform resource locator (URL) visited by the browser;
          trace visits to a number of redirection URLs in response to the browser visiting the given URL;
          log the visit to the given URL and the visits to the redirection URLs in the trace file; and
          generate a topology graph that indicates redirection relationships between the number of redirection URLs.

11. The system of claim 10, wherein the trace file indicates directly visited URLs and indirectly visited URLs.

12. The system of claim 10, wherein the one or more processor-accessible storage media store a dynamic link library (DLL) that loads into the browser and implements a URL tracer as a proxy, wherein requests to visit URLs from the browser are routed through the proxy.

13. The system of claim 10, wherein the strider tracer module includes instructions executable by the processor to record one or more pages hosted by the given URL and one or more pages hosted by the number of redirection URLs.

14. The system of claim 10, wherein the number of redirection URLs are visited with a redirection blocking feature enabled.

15. The system of claim 10, wherein the strider tracer module includes instructions executable by the one or more processors to trace registry writes, file writes, process creations, or combinations thereof.

16. The system of claim 10, wherein the one or more processor-accessible storage media store a honey monkey controller executable by the one or more processors to analyze the trace file to determine whether an exploit has been detected with respect to the visit to the given URL, with respect to the visits to the number of redirection URLs, or a combination thereof.

17. The apparatus of claim 10, wherein the redirection URLs include URLs that a content location instructs a client to auto-visit while remaining at the content location.

18. A method comprising:
    determining a given uniform resource locator (URL) visited by a browser;

tracing cross-domain auto visits to a number of redirection URLs in response to the browser visiting the given URL;

logging the visit to the given URL and the cross-domain auto-visits to the redirection URLs in a trace file; and generating a topology graph that indicates redirection relationships between the number of redirection URLs, wherein the redirection relationships between the redirection URLs include a plurality of cross-domain auto visit relationships between the redirection URLs.

19. The method of claim 18, wherein the generating the topology graph includes visually distinguishing between directly visited URLs and redirection URLs.

20. The method of claim 18, further comprising analyzing the trace file to determine whether an exploit has been detected with respect to the visit to the given URL, with respect to the visits to the number of redirection URLs, or a combination thereof.

* * * * *